I. R. HICKS.
PISTON RING.
APPLICATION FILED MAR. 17, 1915.
1,171,199.
Patented Feb. 8, 1916.
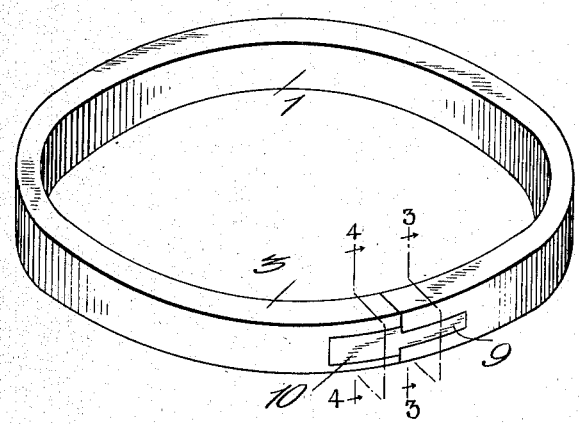
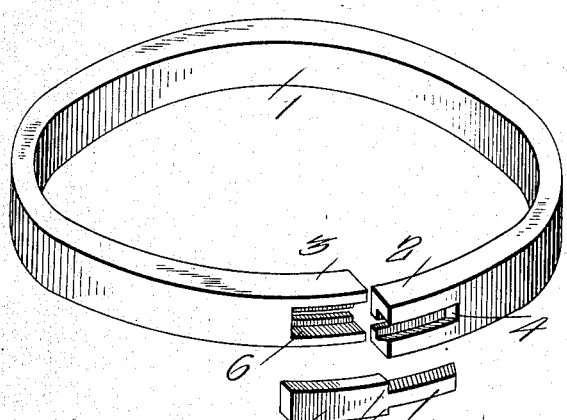
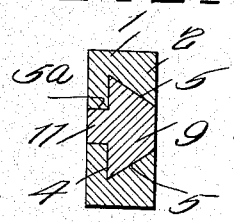
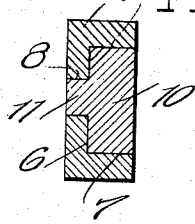
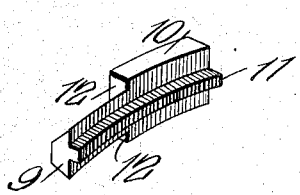
WITNESSES:
Lo. B. James
C. E. Traunor
INVENTOR
Irl R. Hicks
BY Munn & Co.
ATTORNEYS

UNITED STATES PATENT OFFICE.

IRL ROBERT HICKS, OF HALLSVILLE, MISSOURI.

PISTON-RING.

1,171,199.  Specification of Letters Patent.  Patented Feb. 8, 1916.

Application filed March 17, 1915. Serial No. 14,930.

*To all whom it may concern:*

Be it known that I, IRL R. HICKS, a citizen of the United States, and a resident of Hallsville, in the county of Boone and State of Missouri, have made certain new and useful Improvements in Piston-Rings, of which the following is a specification.

My invention is an improvement in piston rings, and the invention has for its object to provide a ring of the character specified which while flexible, contractible, and expansible to permit its easy insertion and removal will yet make a fluid tight joint both between the piston and the cylinder walls and between the ring and the piston, and wherein the arrangement is such that there is nothing to score or cut the cylinder wall during the reciprocation of the piston.

In the drawings: Figure 1 is a perspective view of a piston ring constructed in accordance with the invention, Fig. 2 is a similar view with the connector displaced, Figs. 3 and 4 are sections on the line 3—3 and 4—4 respectively of Fig. 1, each looking in the direction of the arrows adjacent to the line, and Fig. 5 is a perspective view of the connector looking from the inner side.

The present embodiment of the invention is shown in connection with a piston ring 1 of the usual form, the ring being of suitable material and of suitable cross section and being split so that the ends 2 and 3 abut when the ring is in normal condition. The end 2 of the ring is recessed longitudinally, as indicated at 4, the recess extending from the split end some little distance and opening on the outer face of the ring. The side walls of the recess are undercut, as indicated at 5, and the recess has an extension $5^a$ extending to the inner surface of the ring, the said walls of the extension being parallel or approximately so as shown. The end 3 of the ring is also recessed, as indicated at 6, the recess extending from the end a suitable distance and opening at the outer surface of the ring. The side walls 7 of the recess 6 are parallel as shown and the recess has an extension 8 opening at the inner wall of the ring. The side walls of the extension 8 are parallel and this extension is of the same width as the width of the extension $5^a$ of the recess 4.

A connector is provided for connecting the ends of the ring, the said connector consisting of integral portions 9 and 10. The portion 9 is shaped to fit the recess 4, and the portion 10 is shaped to fit the recess 6. The connector as a whole is curved longitudinally on the same arc as the ring, and the inner faces of the portions 9 and 10 are continuous. The portion 10 is rectangular in cross section and the connector as a whole is provided on its inner face and at the longitudinal center thereof with a rib 11, the said rib being shaped to fit the extensions $5^a$ and 8 of the recesses 4 and 6.

The upper and lower side walls of the portion 9 of the connector are beveled, as shown, to fit the undercut side walls 5 of the recess 4 and the portion 9 is thus prevented from movement laterally with respect to the end 2 of the ring. To place the improved piston rings, the connector may be placed either before or after the ring is sprung on the piston. In either case the end 3 of the ring is moved laterally with respect to the end 2 as indicated in Fig. 2 and the portion 9 of the connector is pushed longitudinally into the recess 4, until the shoulders 12 formed between the inclined walls of the portion 9 and the parallel walls of the portion 10 abut the end of the end 2 of the ring. The end 3 may now be released and the portion 10 of the connector will slip into the recess 6.

The rib 11 of the connector will enter the extensions $5^a$ and 8 of the recesses 4 and 6, and will hold the ends 2 and 3 from movement laterally with respect to the plane of the ring, while the connector will not interfere with the spreading movement of the ends of the ring. Neither will the connector interfere with the movement of the said ends toward each other, and it will be evident that the ring will be as flexible with the connector in place as were the same removed, or as with the ordinary piston ring having lapping ends.

The improved rings may be constructed at a reasonable cost and there is nothing complicated to easily get out of order. Neither is there connecting pins or the like to score the cylinder and the connector will make a tight joint between the ends of the ring, not only between the ring and the cylinder wall, but also between the ring and the piston.

I claim:—

1. A piston ring, having its ends abutting, and each end being recessed, and a connector for the ends of the ring, and shaped to fit the recesses of the ends, said recesses opening on the outer face of the ring and one of the recesses having parallel side walls and the other having undercut side walls, each recess having an extension to the inner face of the ring and of lesser width than the recess, and the connector having a rib fitting the said extensions, the extensions being in alinement.

2. A piston ring having its ends recessed longitudinally, and a connector for connecting the said ends, and shaped to fit the recesses, the recesses opening at the peripheral face of the ring, one recess having undercut side walls to prevent disengagement of the said end of the connector outwardly, and each recess having an extension opening at the inner face of the ring, the connector having a rib fitting the extensions of the recesses.

IRL ROBERT HICKS.

Witnesses:
G. T. POLLARD,
D. D. CARPENTER.